Figure 1:
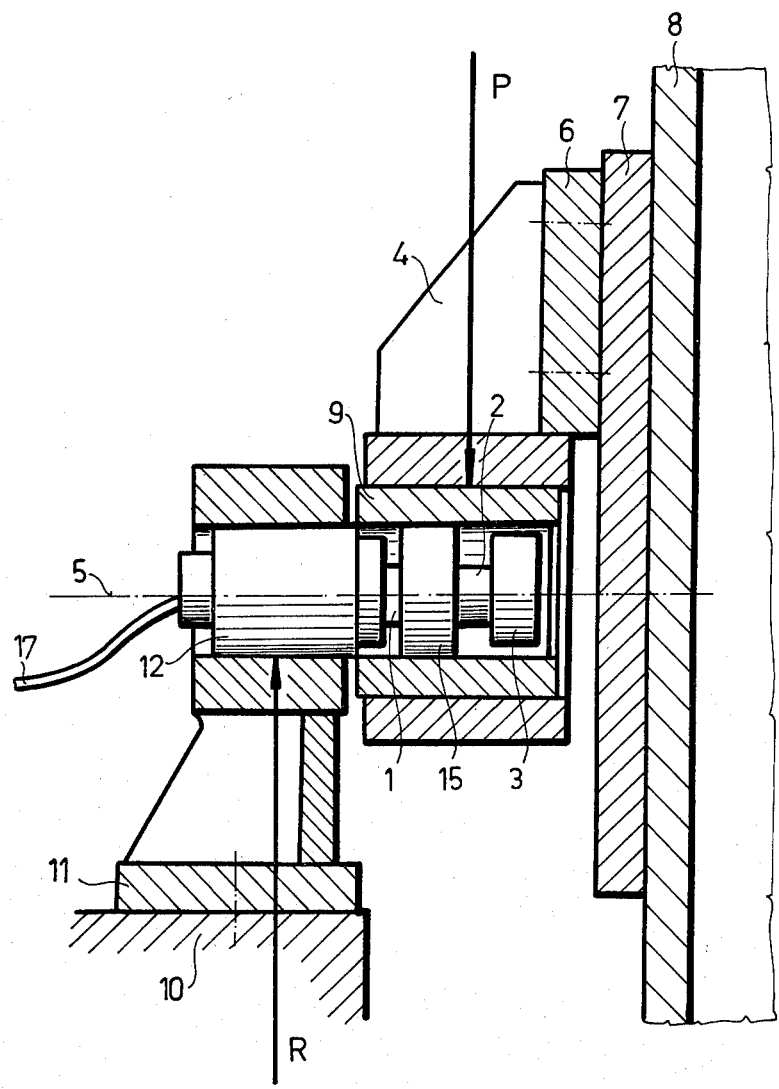

United States Patent [19]

Kovács

[11] 4,350,048

[45] Sep. 21, 1982

[54] MEASURING JOURNAL FOR THE CONVERSION OF FORCE TO ELECTRIC SIGNAL

[75] Inventor: Sándor Kovács, Budapest, Hungary

[73] Assignee: Vasipari Kutató Intezet, Hungary

[21] Appl. No.: 87,532

[22] Filed: Oct. 23, 1979

[30] Foreign Application Priority Data

Jan. 10, 1979 [HU] Hungary ............................ VA 1538

[51] Int. Cl.$^3$ .......................... G01L 1/22; G01L 5/00
[52] U.S. Cl. ................................ 73/862.54; 73/862.65
[58] Field of Search ................. 73/136 R, 141 A, 143, 73/862.65, 862.54, 862.56, 862.04

[56] References Cited

U.S. PATENT DOCUMENTS

| | | | |
|---|---|---|---|
| 2,983,140 | 5/1961 | Crane | 73/143 |
| 3,026,491 | 3/1962 | Dubský et al. | 73/136 R X |
| 3,104,544 | 9/1963 | Guiot | 73/136 R |
| 3,205,706 | 9/1965 | Tracy | 73/862.66 |
| 3,370,296 | 2/1968 | Greenberg | 73/862.04 |
| 3,528,285 | 9/1970 | Jackson | 73/136 R |
| 3,554,025 | 1/1971 | Andersson et al. | 73/862.66 |
| 3,853,001 | 12/1974 | Mock | 73/862.56 X |
| 3,969,935 | 7/1976 | Shoberg | 73/862.66 |
| 4,058,178 | 11/1977 | Shinohara et al. | 73/862.65 X |
| 4,140,010 | 2/1979 | Kulpmann et al. | 73/862.65 X |
| 4,162,632 | 7/1979 | Steinmueller | 73/141 A |
| 4,199,980 | 4/1980 | Bowman | 73/141 A |

FOREIGN PATENT DOCUMENTS 173832 1/1953 Fed. Rep. of Germany ... 73/862.56

Primary Examiner—Daniel M. Yasich
Attorney, Agent, or Firm—McGlew and Tuttle

[57] ABSTRACT

The measuring journal according to the invention permits the construction of a measuring body which solves the troublefree transmission of a force between the structural elements, when measuring is carried out with the conversion of forces to electric signals, while in place of the shear- and bending stress, the mechanical stress is used for measuring-technical purpose. The measuring journal contains measuring elements connected to a central body and are developed as a longer and as a shorter measuring element. The torsional axes of the measuring elements are parallel with each other, are arranged symmetrically on both sides of the plane determined by the influence lines of the force bringing about the torsion and by those of the reaction force and are eccentric in relation to the geometrical axis of the measuring journal, while the plane determined by them is perpendicular to the plane determined by the reaction force and torsional force. The two ends of the measuring elements are linked through an arm of force to the connecting element that takes up the torsional force or reaction force, while the other ends of the measuring elements are in rigid connection with each other.

6 Claims, 15 Drawing Figures

MEASURING JOURNAL FOR THE CONVERSION OF FORCE TO ELECTRIC SIGNAL

The invention relates to a measuring journal for the conversion of a force to an electric signal.

In the field of force measuring one of the significant problems is to realize the conversion of a force to an electric signal. The conversion is realized with a measuring body connected as a mechanical double-pole in the path of the force. The active or measurable force acts on one of the poles, while the reaction force acts on the other pole. The mechanical stress field necessary for equilibrium will develop between the two poles in the measuring body. The relationship between the stress and the deformation is determined by the geometrical dimensions and by the constant that is characteristic of the material.

The known measuring converters can be dimensioned in most cases based on elementary statical relations. The electric measuring elements, mainly strain measuring resistors based on the piezoelectric effect—sensing the deformation—are positioned on any push of the surface of the measuring body. The measuring circuit built up from the resistors such as disclosed in U.S. Pat. Nos. 3,969,935; 3,554,025; and 3,205,706, all of which are incorporated herein by reference supplies the electric output signal, that is in proportion to the force to be measured.

So far in practice efforts have been aimed at the coincidence of the force to be measured and the influence line of the reaction force. This is most effectively realized with the tensioned or compressed prism. The stress field—arising in the measuring body—is intersected by the influence lines. The tube cross sectional prism represents such a case in which the influence line is surrounded by the stress field and the force is distributed along the tube cross section. Uniformity of the distribution is absolutely necessary the correct functioning. If the axis and influence line do not coincide, then the correction is ensured with the formation of the measuring circuit.

Progress was made when parts subjected to tensile and compressive stress were developed in the measuring body, whereby increase of the signal level was obtained.

In the case of using several prismatic bodies the coincidence of the common center of gravity of the cross sections and the influence line is the condition of the correct functioning.

The tensile and compressive stress are realized by the bent holders too. This serves as the basic principle of several constructions. However at the measuring body formed as a simple holder fixed at one end, the arm of force bringing about the momentum does not remain constant in the course of the inclination, thereby causing a non-linearity error. In the case of a holder supported at both ends the friction arises at the supporting point, while in the case of rigid clamping other additional stress arises. Several solutions were devised for the elimination of this detrimental phenomenon, but those solutions have a common disadvantage in the excessive structural height occurring along the influence line of the force.

In a large group of the solutions the tensile or compressive stress developing as a result of the tangential stress due to shearing, ensures the operation of the sensor. Also the bending ensures a similar converting mechanism in the planes parallel with the plane indicated by the bending force and the arm of the bending.

The torsion too—as the resultant of the shear stress—provided places exposed to tensile and compressive stresses on the torsional measuring body. Measuring of the force has been realized in several solutions with measuring bodies put to torsion. In all of them however a significant structural dimension in the direction perpendicular to the axis of the torsion and accordingly dimensioned rigid construction are required. If the torsional measuring parts are formed as prismatic bodies—the axis of torsion being in a plane perpendicular to the force to be measured—then the structural dimensions in the direction of the force may be reduced at the expense of increasing the dimensions of the plane containing the axis of torsion. The influence line of the force to be measured and that of the reaction force arising on the other half of the measuring converter, here too coincide. Thus—as in the case of all measuring bodies—the measuring converter functions as a mechanical couple. However the measuring converter with a bent measuring body in addition to the measurable force and reaction force, requires either more reaction forces or—if the force to be measured and the reaction force forms a couple—it requires a reaction momentum contrary to the momentum represented by them. Their realization and keeping them steadily at constant value would be possible with special structural solutions only. These solutions show significant deviation from the traditional measuring converters. The ratio of the advantages to the expenditure decides the applicability of the construction. If the dimension dispersion given by the production tolerances is taken into account, the advantages will diminish considerably and only the extra expenses remain.

All these alternatives—as stated before—may be treated as a single couple, if the forces and moments necessary for the equilibrium in the measuring body within the construction are regarded as internal forces and moments, and the proper functioning requires that the influence line of the force to be measured and that of the measuring converter should coincide. One of the most important requirements of the whole measuring system functioning properly is to ensure this condition. The realization may take place in various ways according to the various measuring tasks. It will be manifest in every case, that the measuring converter and the auxiliary elements of the installation are fairly extensive in the direction of the influence line.

For application of the measuring journals a typical example is the utilization in the crane balance. The force sensors in the crane system may be built into the travelling crab, hoist, or into the mounting of the hoist. The force sensor is loaded with load carrying mechanism too, reducing the effective measuring range of the measuring cells, to which all measuring-technical characteristics are related. Consequently regarding the measuring-technical considerations it is practicable to build in a light-weight mechanism as far as possible, which is of the lowest weight in the case of installation into the hoist and the heaviest when built into the travelling crab. Thus at installation of the force sensor into the hoist, the measuring range of the force meter in the measuring system hardly varies, while at the installation into the travelling crab a 30–50% loss of effective signal should be reckoned with. Due to the safety requirements the design of the hoist demands very strict specifications for the crane constructor. Solving of the necessary task in the designed construction may require such modifications which can not be accomplished in every case. The mounting system of the hoist allows more liberty. This represents a still permissible structural weight and does not exceed 4–7% of the measuring range, i.e. that much is the loss of the effective measuring range of the force sensor.

A certain loss of the lifting height of some of the cranes is permissible, thus the cost of installation of the force meter will be relatively low. On the other hand the loss of the lifting height in other, first of all in the metallurgical heavy-duty crane systems is not permissible, thus the installation can be carried out only with extensive modification.

It is necessary to ensure at the installation that only the forces coinciding with the influence line should develop in the force measuring system. However very significant and different dynamic forces too may arise during the operating conditions, representing an additional load on the force measuring system and on its auxiliary elements. These loads influence the lifespan of the measuring bodies and may frequently cause severe breakdown.

The holder-type force meters solve such development of the mechanical stress field on the holders which is necessary for carrying out the measuring task. Another art of the measuring converters use the tensile-, compressive- or shear stress as the basis of conversion. Each solution has a common feature by requiring a greater or lesser quantity of auxiliary elements for the installation, consequently the criterion of solving the conversion of a force to an electric signal as an independent unit is not fulfilled.

Examining these mechanical systems it can be ascertained that the journals perform significant tasks. They ensure the connection of the various structural elements, fix their positions in relation to each other, permitting certain movements as well. The cylindrical surfaces of these journals serve a dual purpose. With one of their parts they are connected unmovably to some kind of holding structural element, while another part of them is used as bearing support. Their role is definite also in the flow of force: in addition to the shear and bending stresses they should ensure the power transmission between the elements.

The present invention is aimed at eliminating the described difficulties and to develop such a measuring body which solves the troublefree transmission of the force between the structural elements, while in place of the simple shear and bending stress utilization of the mechanical stress is realized for measuring-technical purpose.

The objective according to the invention is solved with longer and shorter measuring elements connected to a central body in such a way, that their torsional axes are parallel with each other, are arranged symmetrically on both sides of the plane defined by the influence lines of the torsional force (P) and the reaction force (R) and eccentrically in relation to the geometrical axis of the measuring journal, while the plane defined by them is perpendicular to the plane fixed by the reaction force and torsional force. Two of the ends of the measuring elements are connected with the element taking up the torsional force or reaction force through the inertia of the arm of the force, while the other ends of the measuring elements are in rigid connection with each other.

The measuring journal is provided with two measuring elements formed as a bar, one end of which is in rigid connection with the disc-shaped central body, the axis of which is parallel with and of larger diameter than the bar. Both measuring elements are eccentrically fixed to the same plate of the central body. The other end of the longer measuring element is eccentrically fixed to the disc-shaped connecting element taking up the reaction force and its axis is parallel with the measuring element while the shorter measuring element is fixed to the disc-shaped connecting element taking up the torsional force and its axis is parallel with the measuring element, which is provided with a cutout for the longer measuring element.

One measuring unit may also contain several measuring element-pairs according to the invention. These are rigidly connected with each other in pairs. The connection may take place at the shorter or longer measuring elements or at the central body. The methods of connection may be combined with each other.

The invention is based on the recognition that the suitable geometrical construction of the journals can ensure the stress field necessary for the conversion of a force to an electric signal at torsional stress without the additional machine elements necessary for fitting into the system.

The force measuring system according to the invention unites the character of the journal with all its simple application possibilities and the mechanical stress field necessary for the conversion, while the mechanical and electrical symmetry, the inhomogeneous stress field and the principle of "single body" are preserved at the same time. This dual character is realized in the measuring journal cell.

The proposed measuring journal which may be a bearing comprises an elementary frame construction, which carries in itself all the advantages of the so-called journal cells, whereby the dimension tolerances do not influence the parallelism of the axes of the torsional measuring parts. Thus a single-valued function relation exists between the force to be measured and the stress condition brought about by it. This elementary frame construction also ensures the high-grade constructional versatility in the applied technique. It shows statically high-grade rigidity against the oblique forces or lateral force effects, measuring the force component in the measuring direction only. In the direction perpendicular to the measuring direction—owing to the high-grade rigidity—the stress is not significant. On the other hand the torsional moment necessary for the measuring does not arise, since the influence line of the force component intersects the axes of torsion.

A further advantage is provided by the construction of this invention, whereby the optional elementary frame construction is connected in such a way that the axes of the torsion remain parallel. This way a measuring journal is developed permitting the installation of a two-, three- etc. -support holder.

This way both the measuring-technical characteristics and the mechanical construction ensure favorable applicability in the force and weight measuring constructions of electric system.

Figure 2:
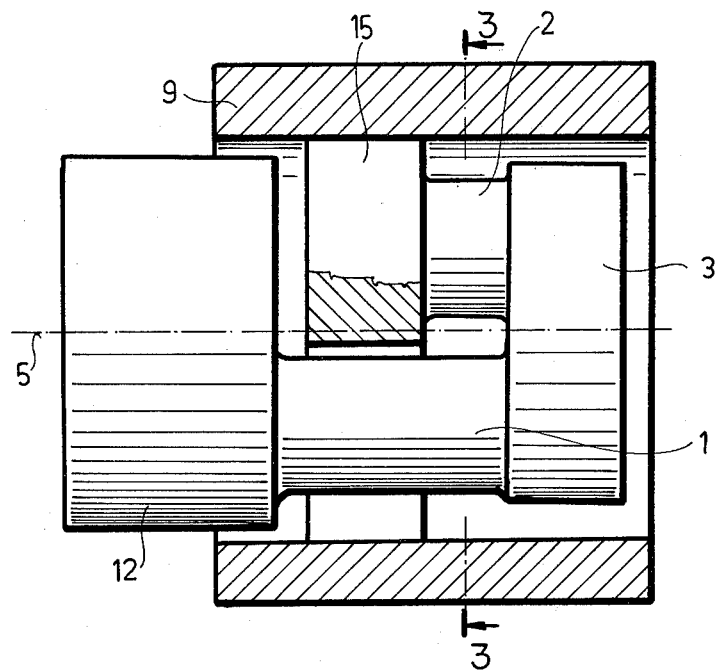
Figure 3:
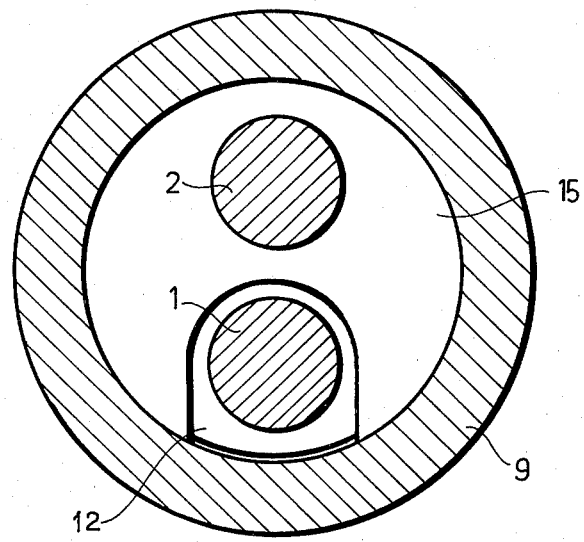
Figure 4:
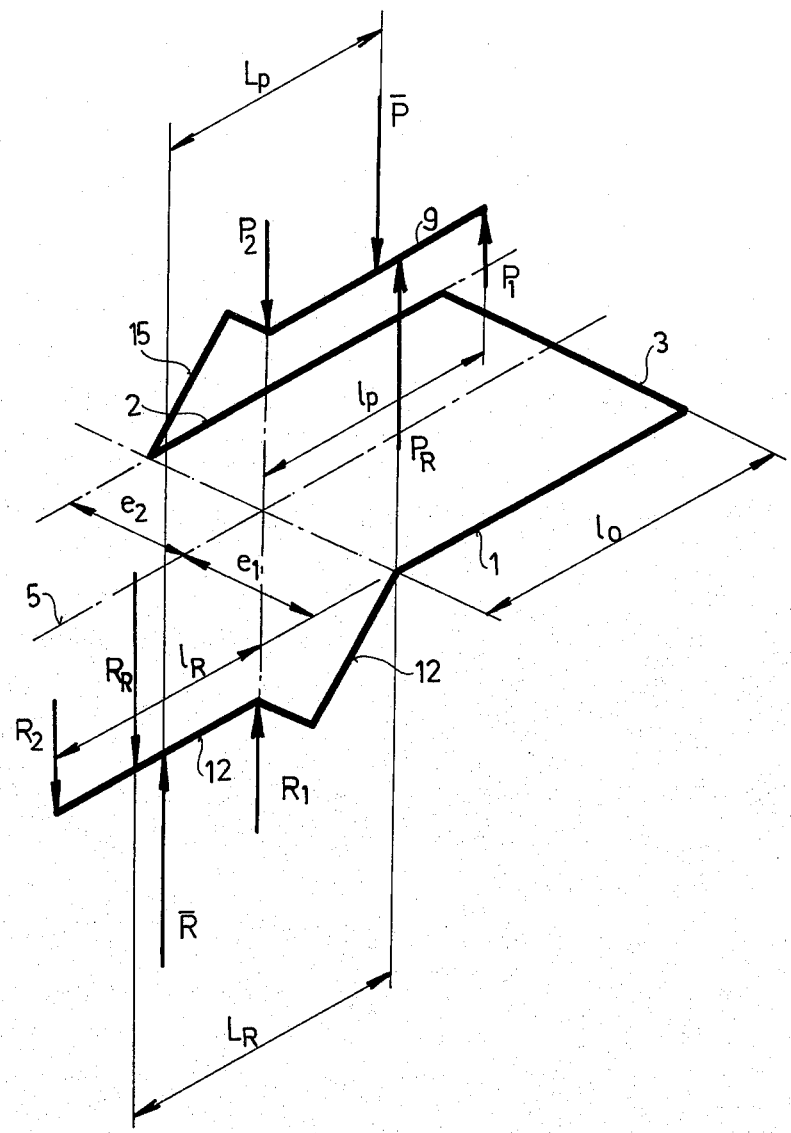
Figure 5:
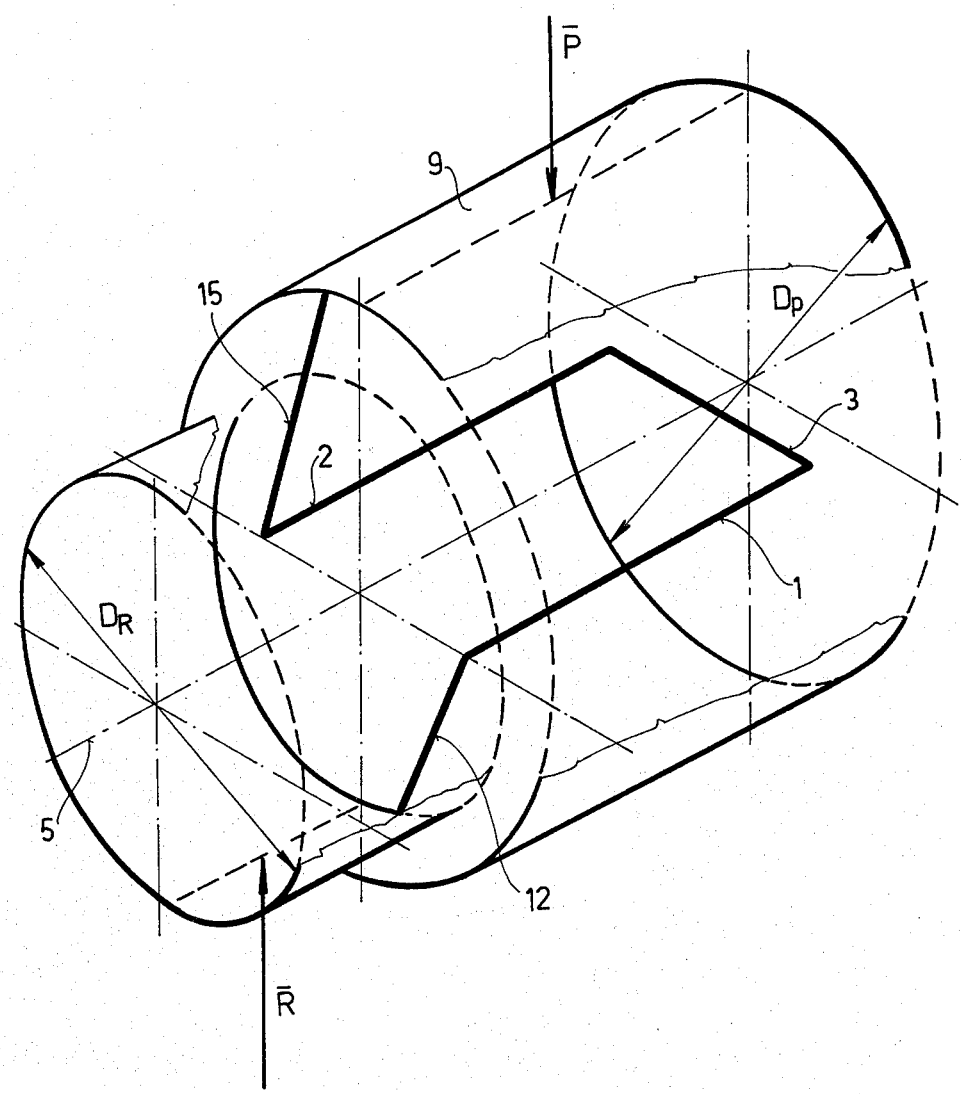
Figure 6:
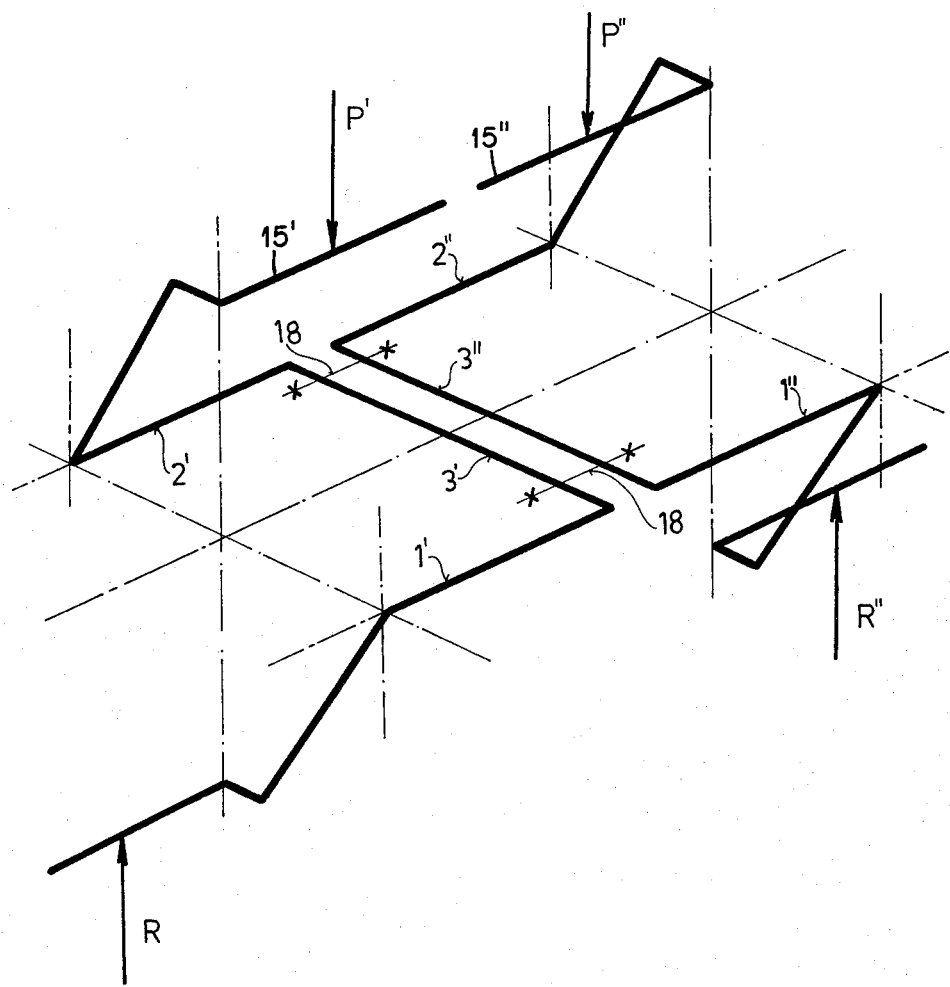
Figure 7:
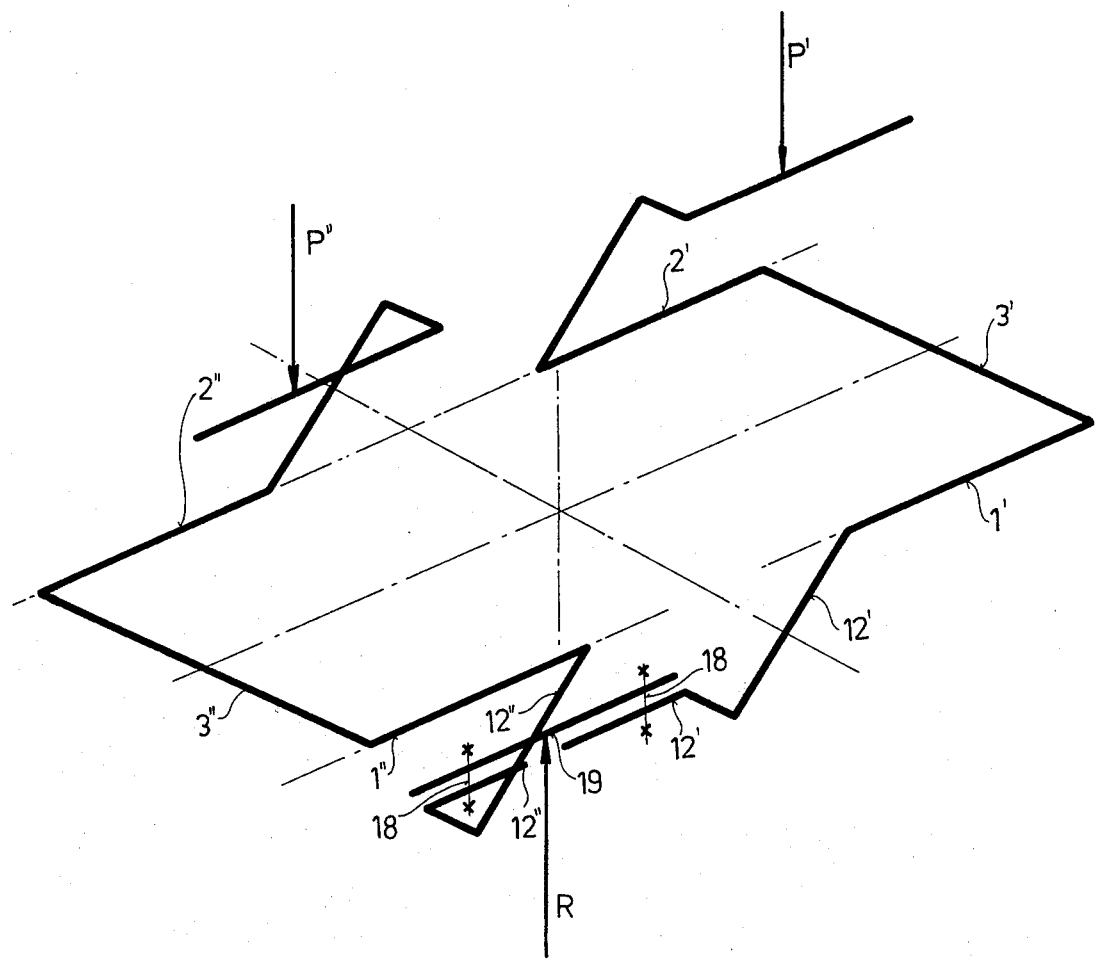
Figure 8:
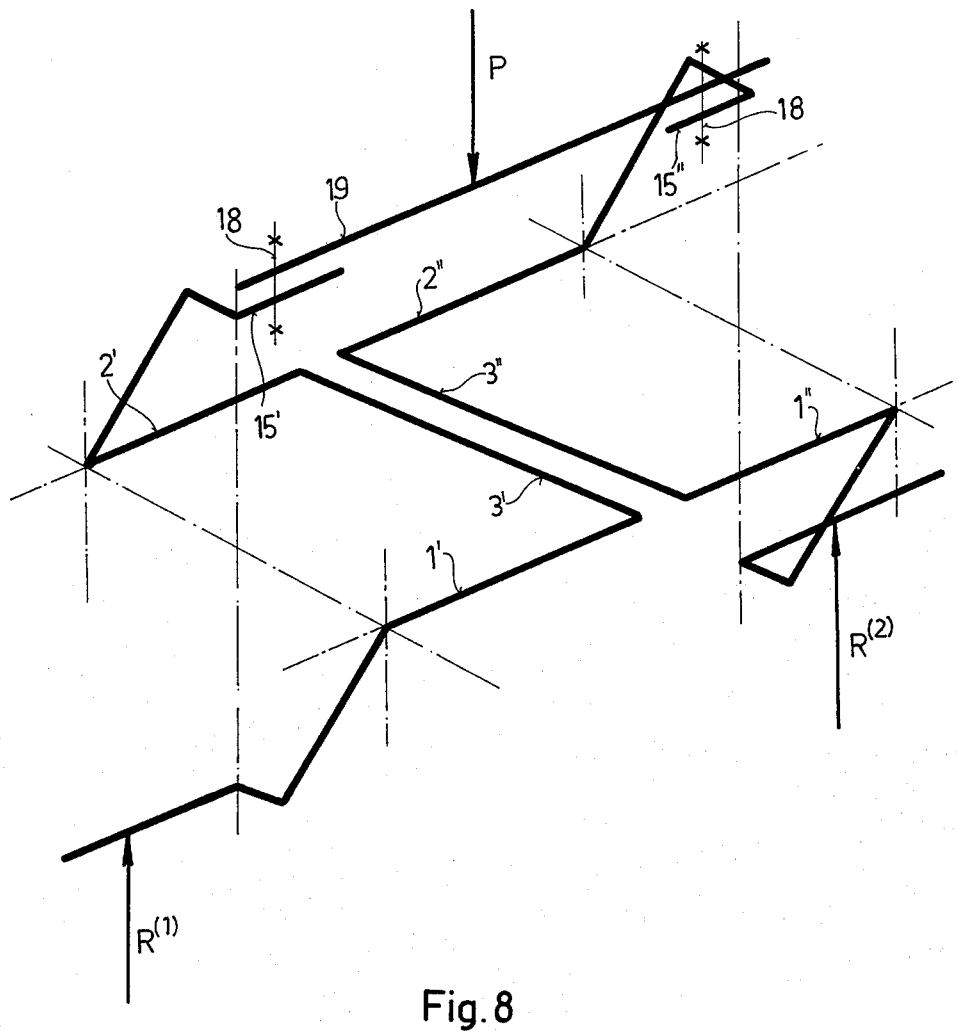
Figure 9:
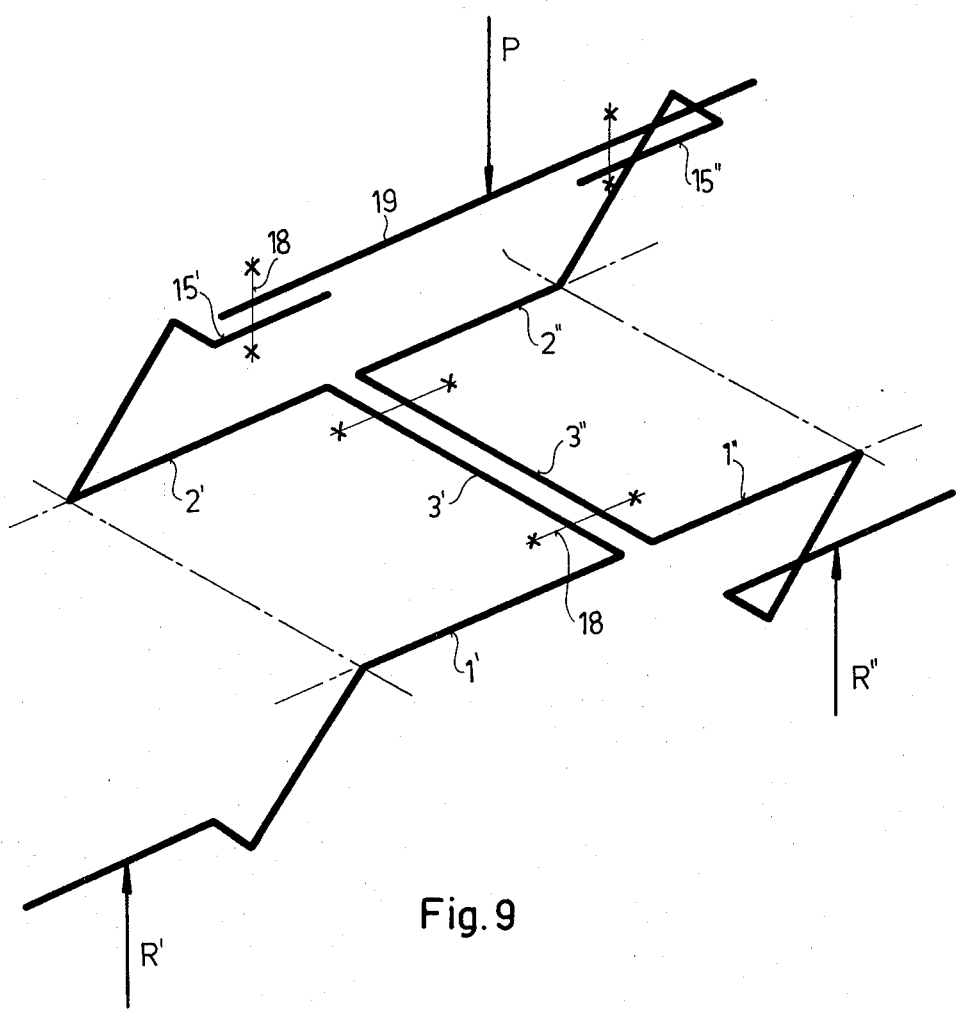
Figure 10:
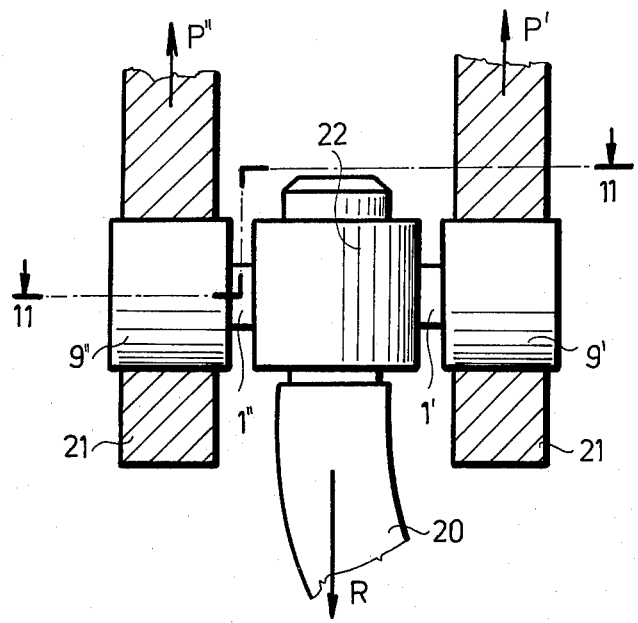
Figure 11:
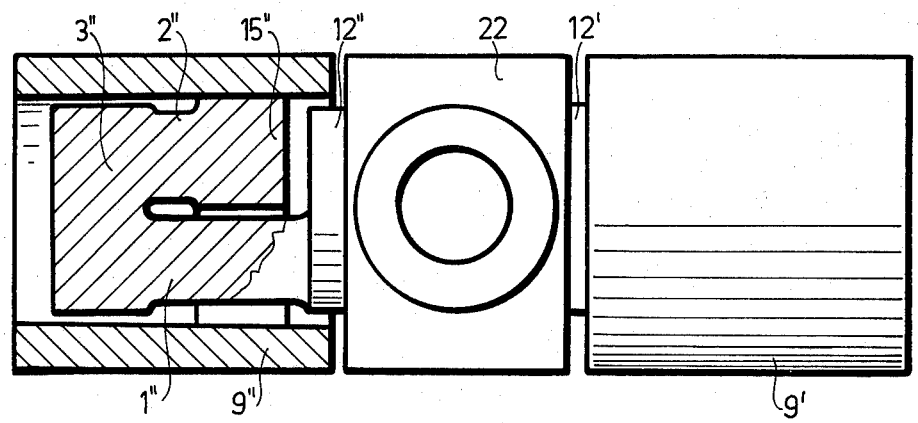
Figure 12:
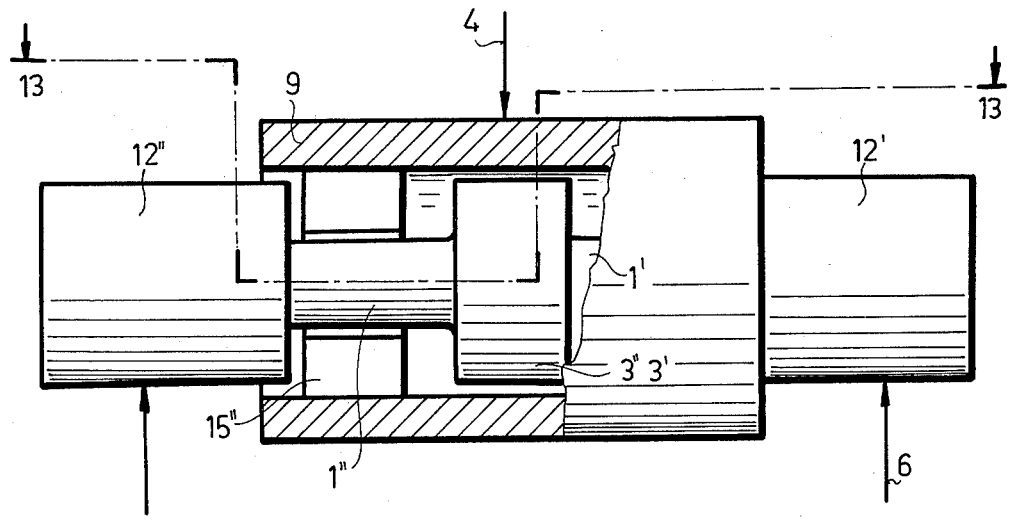
Figure 13:
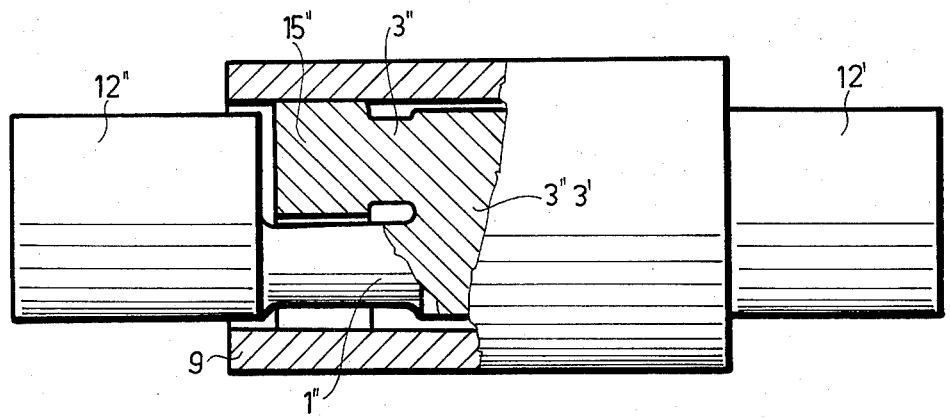
Figure 14:
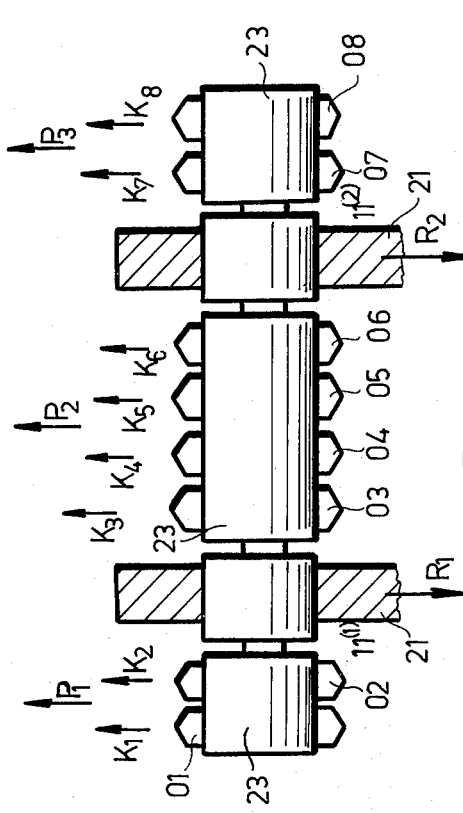
Figure 15:
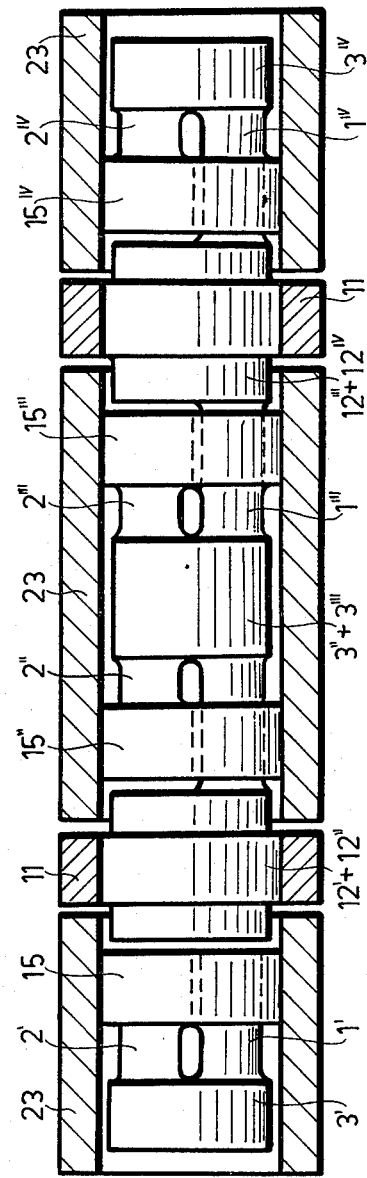

Further details of the invention are described in construction examples with the aid of the drawing. The drawing illustrates the following:

FIG. 1: a sectional, elevational view installation of a construction model of the measuring journal according to the invention, FIG. 2: a longitudinal view, partially in section of the elementary frame construction shown in FIG. 1, FIG. 3: a transverse, sectional view taken along line 3—3 of the solution shown in FIG. 2, FIG. 4: a schematic diagram of the installation of the measuring journal shown in FIGS. 1-3, FIG. 5: a perspective, schematic illustration of the measuring journal with the mechanical model, FIG. 6: a perspective, schematic illustration of one of the alternatives for the assembly of several elementary frame constructions, FIG. 7: another alternative perspective, schematic illustration for the assembly of two elementary frame constructions, FIG. 8: a further alternative perspective, schematic illustration for the assembly of two elementary frame constructions, FIG. 9: still another alternative perspective, schematic illustration for the assembly of two elementary frame constructions, FIG. 10: a partially sectional view illustrating that installation of the alternative shown in FIG. 7, FIG. 11: a sectional view taken along line 11—11 of the construction shown in FIG. 10, FIG. 12: a partial sectional view of the construction model of the solution shown in FIG. 9, FIG. 13: a sectional view taken along line 13—13 of the construction shown in FIG. 12, FIG. 14: a diagrammatic illustration of this invention illustrating the installation into a load-lifting construction operating with a bunched cable, FIG. 15: a schematic illustration of the method of assembly of the elementary frame construction used as the solution of FIG. 14.

A construction model of the measuring journal according to the invention is shown in FIGS. 1-3. The elementary frame construction consists of a longer measuring element 1, a shorter measuring element 2, and a central body 3. The measuring elements 1 and 2 are connected to the structural units through the connecting elements 12 and 15. The connecting element 15 in the presented solution is formed as the bearing part of the measuring journal and is in the shape of a disc which is provided with a cutout corresponding to the measuring element 1, and fitted into the bushing 9 of the bearing bracket 4.

The bearing bracket 11 holding the connecting element 12 is fixed onto a base 10, while the bearing bracket 4 holding the bushing bush 9 is fixed to the load bearing mechanism 8 with the insertion of spaces 6 and 7.

The measuring elements 1 and 2 are connected to a measuring instrument (not shown) with the aid of any electrically conductive cable 17. The known strain measuring sensors which have been previously incorporated by reference are therefore also electrically coupled to the measuring instrument since the known strain measuring sensors are positioned on any suitable portion of the measuring elements 1 and 2.

The measuring elements 1 and 2 are of cylindrical shape, arranged eccentrically on both sides of the geometrical axis 5 of the measuring journal. The central body 3 is formed as a disc with a smaller diameter than the inside diameter of the bushing 9 and it is in rigid connection with the ends of the measuring elements 1 and 2. The central body 3 is suitably made of two pieces and certain parts are machined together with the measuring elements 1 and 2. The production may be carried out by producing the longer measuring element 1 in one piece with the connecting element 12 and the lower part of the central body 3, while the other part constitutes the shorter measuring element 2, the connecting element 15 and the upper part of central body 3. After machining the two pieces are joined as a rigid system with a permanent joint. The connecting element 15 may be produced as separate pieces too, in which case they are connected to the measuring element 1 and 2 preferably with shrink joint.

The presented construction is naturally only one of the possible solutions and several other construction models are still possible. The connecting elements may be for instance angular, prismatic bodies and the central body 3 may be an optional rigid element.

The schematic illustration of the construction model shown in FIGS. 1-3 is presented in FIG. 4. The force P to be measured which acts on the connecting element 15 via the bushing 9 creates the couple $P_1$, $P_2$ at the place of installation. Force $P_2$ acts as an internal reaction on arm $1_p$ and thus a reaction moment arises which ensures the position of the bushing 9 parallel with the geometrical axis 5, while the force P brings about torsional moment in the measuring element 1 on the arm corresponding to eccentricity $e_1$. The connecting element 15 functions as a holder that is fixed at one end, but owing to its geometrical dimensions it may be regarded as absolutely rigid. In the shorter measuring element 2 which is in rigid connection with the central body 3 and the connecting element 15 in a holder fixed at both ends, bending moment too arises. Its direction is perpendicular to the longitudinal axis of the measuring element 2 having zero value in the plane cut out of the torsional measuring element 2 by the plane passing through force P. Its maximum value appears at the points of connection. This bending moment appears at the point of connection of the measuring element 2 as a torsional moment with respect to central body 3 and its reaction appears at the point of connection of the measuring element 1.

By the correct selection of the geometrical dimensions of the measuring journal, the absolute rigidity of the central body 3 is attainable. On the other hand the torsional moment of the measuring element exposes the central body at one of its ends by bending in a perpendicular direction to the geometrical axis 5, and acting perpendicularly to the longitudinal axis that intersects the axis of the measuring element 2. On the other end of the central body 3 an opposite reaction moment arises, bringing about torsion in the measuring element 1.

The resulting stresses are functions of the $S_o$ cross section of the measuring elements 1 and 2, the moment of inertia $I_o$, $K_{eo}$ equatorial and $K_{po}$ polar section modulus, as well as that of the material properties. These factors determine also the strength properties of the measuring elements 1 and 2.

The other end of the longer measuring element 1 is joined to the connecting element 12, creating in it the R reaction force corresponding to the $e_1$ eccentricity. The parallelism of this element in relation to the geometrical axis 5 ensures that the influence lines of force P and reaction force R do not coincide. This is due to the fact that the construction is not symmetrical with the influence line of force P. This disadvantage is eliminated by linking several elementary frame constructions in pairs. The linking may be solved in several ways. Examples are shown in FIGS. 6, 7, 8 and 9.

The linking may take place at the central body 3 (see FIG. 6), at the connecting elements 12 linked to the measuring element 1 (see FIG. 7), or at the connecting element 15 linked to the measuring element 2 (see FIG. 8). The linking may be carried out with a combination of the mentioned basic alternatives too. An example is shown in FIG. 9, where the central body 3 and the measuring element 2 are linked at the connecting element 15.

If the two elementary frame constructions are linked at the central bodies according to FIG. 6, then the rigid connection of central bodies 3' and 3" results. The joint 18 may be realizable or a welded joint is used. Central bodies 3' and 3" may be machined from one piece and this solution provides the most favorable properties. The so-developed system is loaded by the momentum brought about by $R_1$, $R_2$ couples on arm $1_R$. This too is an internal load on the construction falling outside the flow of force running through all the elements of the frame construction and ending between the PR forces.

The rigid frame construction tends to turn from the P and R forces as the couple acting on arm $L_o$ around the axis being in and perpendicular to the plane fixed by measuring elements 1 and 2 and geometrical axis 5. This turn is prevented by the couple as a reaction moment consisting of forces $P_R$ and $R_R$ arising in the construction and acting along arm $1_R$.

FIG. 5 shows the plan according to FIG. 4 arranged in the measuring journal suited to the construction model presented in FIGS. 1-3. It is evident that force P acts on the $D_p$ diametric external mantle of the bushing 9. Measuring elements 1 and 2, central body 3 are arranged within the construction and are connected with the other parts of the construction through connecting elements 12 and 15. The reaction force R acts on the $D_R$ diametric mantle of the connecting element 12 shaped as the journal part.

In the construction shown in FIGS. 1-6 with two concentrated forces P' and P" functions as a holder supported or fixed at the two ends. The P' and P" forces may be the resultants of the force system, in addition to which reaction forces R' and R" also arise in the system.

The two frame constructions may be linked also with the connecting elements 12' and 12" attached to measuring elements 1' and 1". This alternative is shown in FIG. 7. Here the connecting elements 12' and 12" are fixed to each other with a joint 9 and/or a connecting bushing 19. The best solution is when the connecting elements 12' and 12" are machined from a single piece.

The linking of the two elementary frame constructions may be carried out at the connecting elements 15' and 15" of the shorter measuring elements 2' and 2" as well (see FIG. 8). The realization of this solution requires special care, since absolute rigidity and frictionless condition must be ensured. The joint is solved similarly with a bushing 19 or a joint 18. The system can be loaded with a force supported or fixed at both ends and with one or several concentrated or divided forces in the center.

Linking of the elementary frame constructions can be accomplished also with the combination of the mentioned solutions. FIG. 9 shows the plan of such a solution, where the linking is solved at the central bodies 3' and 3" and at the measuring elements 2' and 2". In the presented alternative the central bodies 3' and 3" are fixed with a joint 18 and the measuring elements 2' and 2" are fixed to each other with the connecting bushing 19. With this solution the reaction forces R' and R" symmetrical or nearly so to the influence line of force P are obtained, which in the case of R'=R" being approximately equal, represents a usable supporting structure.

The solutions presented in FIGS. 6 and 8 are suitable for solving special problems only. In the construction according to FIG. 6 the forces P' and P" loading the connecting elements 15' and 15" may be of different magnitude. This solution is advisable when the values of forces P' and P" have to be determined separately, since the single apostrophe (') and double apostrophe (") system can be developed as an independent measuring system. Development of the reaction forces R' and R" is influenced by the linking of the central bodies 3' and 3", whereby a certain compensation is brought about. The compensation depends on the symmetry relations of the systems. Thus this solution is suitable first of all for special tasks only.

The solution shown in FIG. 8 is similar. Here however the arrangement of the force P is not symmetrical. Consequently the reaction forces R' and R" are not symmetrical either. This difference should be taken into consideration when dimensioning the systems.

The solutions shown in FIGS. 7 and 9 can be used in most cases. The practical buildup of the measuring system according to FIG. 7 is shown in FIGS. 10 and 11.

The illustrations show the hoist of a crane. The elementary frame constructions are arranged on both sides of the crane hook 20. The connecting elements 15' (not shown) and 15" mounted in bushings 9' and 9" respectively are embedded in bridles 21 of the crane, together with the other elements of the plan shown in FIG. 7. The connecting elements 12' and 12" are united in unit 22 between the connecting elements 15' and 15". The reaction force R acts on the centerline of crane hook 20, while the forces P' and P" appear in the symmetry plane of the bridles 21. (The described operation is not influenced by the fact that the force P and the reaction force R have been interchanged, since in the case of the hoisting machines the effective force is exactly the lifted weight force, here appearing as a reaction force.)

The bushing 9' and 9" include the connecting elements 15' and 15", and the measuring elements 1' and 1" as well as 2' and 2" held together and united by the central bodies 3' and 3". The measuring elements 1' and 1" as well as 2' and 2" and the furthermore central bodies 3' and 3" function as a single body because of the rigid connection.

Thus the dual measuring journal in FIGS. 10 and 11 functions as a hook bridle performing the sensing of the arising force too at the same time.

A practical construction model of the plan shown in FIG. 9 is presented in FIGS. 12-13. In this solution the measuring elements 1' and 1", and the connecting elements 12' and 12" as well as the connecting elements 15' and 15" are arranged symmetrically to each other on both sides of the central bodies 3' and 3".

A further construction model is shown in FIG. 14. Here the measuring journal was built into a load lifting mechanism with a many-stranded cable. The load lifting mechanisms of the high load-bearing capacity hoisting machines are connected through many strands to the cable drum. The payload is suspended with bridles. Reaction forces $R_1$ and $R_2$ arise in bridles 21, while forces $P_1$, $P_2$ and $P_3$ are the resultants of the various cable forces $K_1$, $K_2$, $K_3$, $K_4$, $K_5$, $K_6$, $K_7$ and $K_8$. The forces are transmitted to the measuring elements via the journal part 23, then from there to the connecting elements. The cable pulleys are embedded in connecting elements and transmit the load to the cable-pairs.

Forces $P_1$, $P_2$ and $P_3$ apply the load on the elementary frame constructions. Their distribution and arrangement are shown in FIG. 15. It is easily noticeable by what method the unity of the elementary frame constructions is realized by the journal parts shown in FIG. 14.

On the basis of the presented examples it is apparent that the measuring journal according to the present invention permits the troublefree transmission of the forces between the various structural elements, at the same time such a complex application is producible with their aid, which permits the utilization of the mechanical stress for measuring-technical purposes.

What I claim is:

1. Measuring journal for conversion of a force to an electric signal said measuring journal including at least two elongated torsion measuring elements having strain measuring sensors thereon, and where a force (P) bringing about a torsion force and a reaction force (R) to the torsion force act on the measuring elements, characterized in that said measuring elements (1, 2) are relatively and respectively long (1) and short (2) and are connected to a central body (3) with each axis of torsion passing through a respective measuring element, said measuring elements being parallel with each other, said measuring elements being arranged symmetrically on both sides of a plane determined by the force (P) acting on one of the measuring elements and bringing about a torsion force and the reaction force (R) acting on the other measuring element said measuring elements being arranged eccentrically in relation to the central axis (5) of the measuring journal, while a plane determined by said measuring elements is perpendicular to the plane determined by the reaction force (R) and by the force (P) bringing about the torsion, one of the ends of each of said measuring elements (1, 2) being respectively coupled to said connecting elements (12, 15) which take up the force (P) bringing about the torsion, as well as the reaction force (R), while the other ends of said measuring elements (1, 2) are in rigid connection with each other.

2. A measuring journal as claimed in claim 1, characterized in that said two measuring elements (1, 2) are each formed as a bar which is rigidly connected with said central body (3) which is disc-shaped and which is parallel with and of larger diameter than said bars in such a way that both said measuring elements (1, 2) are eccentrically fixed to a same said disc-shaped central body (3) while the longer measuring element (1) is eccentrically fixed to said connecting element (12) taking up the reaction force (R), the axis of said connecting element (12) being parallel with said measuring element (1), said shorter measuring element (2) being fixed to said connecting element (15) with its axis being parallel with said measuring element (1), said connecting element (15) being provided with a cutout for said longer measuring element (1).

3. A measuring journal as claimed in claim 1, characterized in that there are more than two measuring elements and said measuring elements are connected with each other in pairs.

4. A measuring journal as claimed in claim 3, characterized in that said measuring element-pairs are connected to each other with the shorter ones of said measuring elements.

5. A measuring journal as claimed in claim 3, characterized in that said measuring element-pairs are connected to each other at the longer ones of said measuring elements.

6. A measuring journal as claimed in claim 3, characterized in that said measuring element-pairs are connected to each other at said central body.

* * * * *